UNITED STATES PATENT OFFICE.

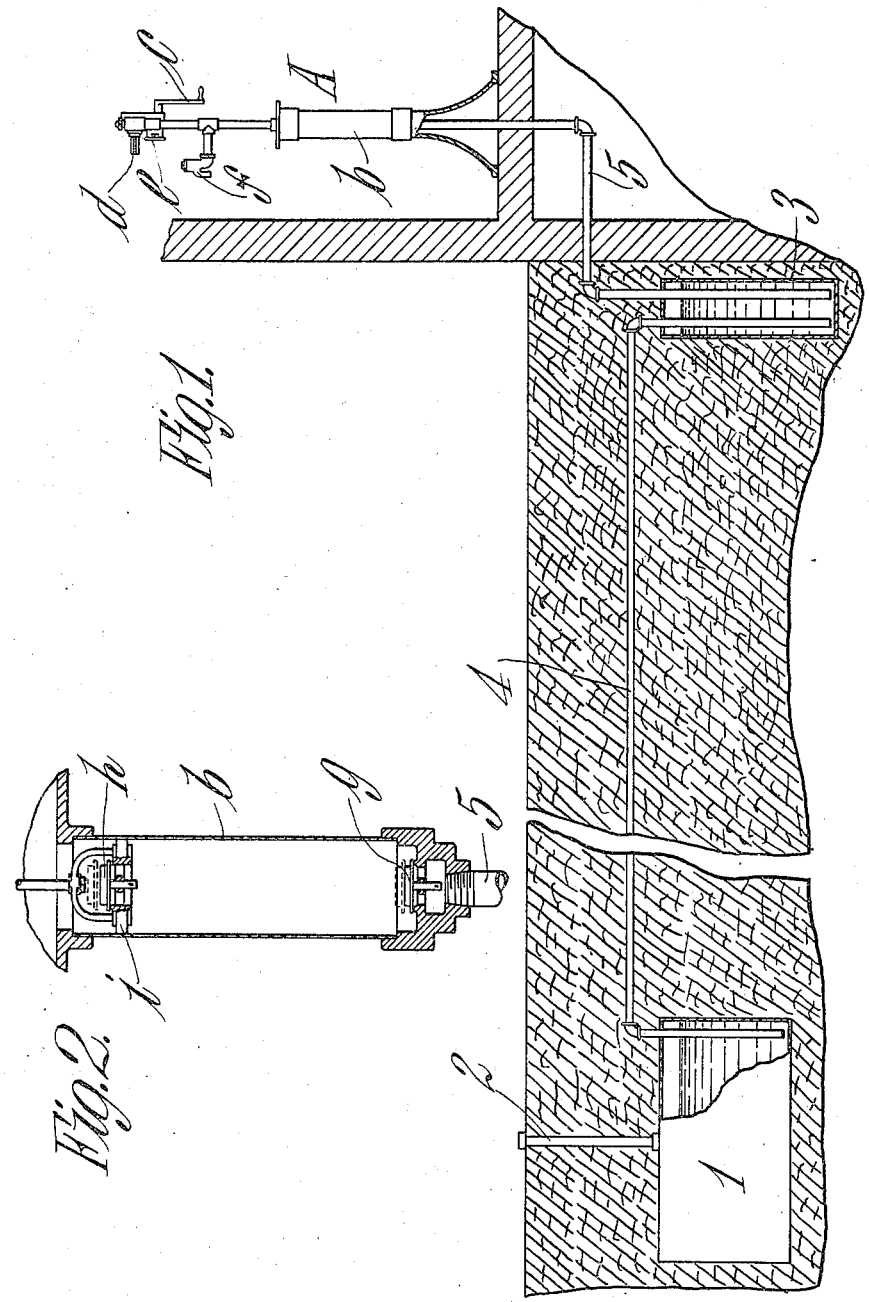

GEORGE C. ROBERTS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

LONG-DISTANCE PUMPING APPARATUS.

1,261,295.  Specification of Letters Patent.  Patented Apr. 2, 1918.

Application filed October 25, 1915. Serial No. 57,734.

*To all whom it may concern:*

Be it known that I, GEORGE C. ROBERTS, a citizen of the United States of America, and residing in Springfield, in the county of Hampden and State of Massachusetts, have invented certain new and useful Improvements in Long-Distance Pumping Apparatus, of which the following is a specification.

This invention relates to improvements in supply apparatus for measuring pumps, and particularly relates to improvements designed to check the surging of the liquid through the pump and, as a result, to improve the accuracy of the latter.

Measuring pumps are now well known and in common use to dispense measured quantities of liquids. One of the widest fields of application of pumps of this class is in the dispensing of oils, such as, gasolene and the like, and measuring pumps have become a necessary part of the equipment of every garage, as well as factories and many other places. The user of measuring pumps is enabled to keep his gasolene supply at a safe distance, not only to comply with local regulations, but also to permit convenient replenishment of the supply, and, at the same time, have the convenience of drawing oil at the desired point. One of the most important requisites of the measuring pump is accuracy where, as is now common, the measurements of the pump are relied upon in determining the price for the amount of the liquid dispensed to a consumer. The pump should register the precise amount dispensed, and this should be true no matter how fast or slow the pump is operated. It is especially important from the seller's standpoint that the pump does not overmeasure.

Heretofore, some difficulty has been experienced with measuring dispensing pumps inasmuch as the total amount of liquid dispensed from the supply tank by the pump, as shown by the meter on the latter, has fallen short of the amount of liquid placed in the supply tank. The tendency has been to charge this discrepancy up to normal shrinkage of the oil, and, while no doubt normal shrinkage does take place, the error is too great to be caused by that alone. I have found by experiment, that where the supply tank is located at a point remote to the pump, an overmeasurement frequently occurs, and this overmeasurement is, moreover, accentuated by rapid operation of the pump. Furthermore, I have determined from experiment that this overmeasurement is caused by a surging of the liquid through the valves of the pump which takes place at the end of the suction stroke and is caused by the momentum of the flowing liquid. The inlet valve of the pump does not close quickly and sharply at the proper time but is held open an appreciable interval by the force of the large quantity of flowing liquid. As a result, an excess amount of the liquid surges past the valve and causes a larger quantity to be delivered than is registered on the meter. Necessarily, since this error is due to the momentum, it varies directly as the mass and velocity of the liquid or, in other words, as the distance of the supply from the pump and as the rapidity of operation thereof. Where the pump is reasonably close to the supply, the error described is not appreciable, but, with more remote location of the supply, the error becomes considerable. Rapid operation of the pump also causes an increase in the error over slow operation for the reasons outlined.

An object of this invention is to provide an improved supply apparatus for a measuring pump which is particularly designed to permit remote location of the supply tank, yet to eliminate inaccurate measurement due to the momentum of the liquid dispensed and caused by the remote location of the supply.

Another object of the invention is to provide a supply apparatus for a measuring pump comprising a supply tank located remote from the pump and an auxiliary tank located near the pump and arranged to directly supply the latter and a siphon connection between the supply and auxiliary tanks arranged to feed the latter, all arranged to prevent inaccurate measurement of the pump from surging.

A further object of the invention is to provide in a supply apparatus of the class described an arrangement of the parts for the automatic reëstablishment of the siphon between the supply and auxiliary tanks, after the latter have been drained by the pump and the supply tank has again been filled.

Other objects will appear in the description to follow and in the annexed claims.

Referring to the drawings as illustrating one preferred manner in which the invention may be put to use—

Figure 1 is a sectional elevation showing the improved supply apparatus; and

Fig. 2 is a sectional elevation of the cylinder of the commonly used measuring pump illustrative of the valve action therein.

Referring to these drawings in detail,—A represents in general a common form of measuring pump. Such pumps are now too well known in the art to require extended illustration or description and accordingly the pump is shown in conventional form only. In the drawings, $b$ represents the cylinder, $c$ the operating crank, $d$ the total meter, $e$ the discharge register, and $f$ the discharge nozzle. For a more complete disclosure of this type of pump, reference is made to the patent granted to John B. Davis June 4, 1907, No. 855,504. The single cylinder pump, such as indicated in the drawing, however, is the more common type of pump than the double cylinder pump shown by the patent.

The cylinders of pumps of the class described are arranged to receive the liquid from the lower end thereof and have an inlet valve $g$ in the base of the cylinder and an outlet valve $h$ in the piston $i$, all as shown in Fig. 2. Both these valves are of the so-called "clack" type and are arranged to open by suction and to be normally held to their seats by gravity. On the upward stroke of piston $i$, the valve $g$ is lifted to its dotted line position by suction while the valve $h$ is held to its seat by gravity and the weight of the liquid above the piston, which is being discharged from the pump. The cylinder $b$ is filled by suction and causes a movement of liquid throughout the length of the pipe from the supply tank. Immediately on the start of the down stroke of piston $i$, the valve $h$ lifts to its dotted line position, and the valve $g$ should immediately close. However, this valve, in order to close, must first check the flowing mass of liquid in the supply pipes, and thus it will be seen that the valve is subjected to the momentum of the liquid. This momentum when sufficiently great, as in the case of remote location of the supply tank or of rapid operation of the pump, holds the valve $g$ open for an appreciable interval after its proper time of closure and allows the liquid to surge past into the cylinder and through the open valve $h$. Thus, a quantity greater than the volume of the pump cylinder is delivered. As the meter $d$ and discharge register $e$ are mechanically actuated from the piston rod, as shown in the above-mentioned patent, and, as the readings of the parts $d$ and $e$ are based upon the delivery of a quantity at each stroke of the piston equal to the volume of the cylinder, it will be seen that a quantity in excess of that registered on the parts $d$ and $e$ is delivered. This error, as above explained, varies directly as the distance of the supply tank from the pump and as the speed of operation of the latter.

To obviate this inaccuracy and at the same time permit the location of the supply tank at a remote point or at a point convenient for filling as adjacent the curb, I provide the system shown in Fig. 1. 1 is a main storage and supply tank which is preferably located underground and may be filled through a pipe 2. It may be desirable in many instances, aside from local regulations compelling a remote location, to have the tank 1 adjacent the curb for convenient replenishment while the point where the pump is placed may be a considerable distance away. To prevent error in the measurement of pump A, where such remote location is necessary or desirable, I provide a small auxiliary tank 3 which is connected to tank 1 by a siphon pipe 4. This tank 3 may be located at a point closely adjacent the pump, as shown in Fig. 1, and is preferably of a somewhat larger capacity than the cylinder $b$ although this capacity is relatively small in comparison with tank 1. The lower end of tank 3 should be located somewhat below that of tank 1 to permit siphon action, and it is also preferable that the tank 3 be air tight for reasons later to appear. A pipe 5 connects the pump cylinder $b$ and the tank 3, and this pipe, as well as pipe 4, extends downwardly to a point closely adjacent the bottom thereof. The pipe 4 is similarly disposed in the tank 1 and, if desirable, may be provided with suitable filters.

In operation, the pump A draws liquid from the auxiliary tank 3, and, as the latter is closely adjacent the pump, the momentum of the liquid in pipe 5 is not great enough to interfere with the delivery of accurate measured quantities from the pump, even though the latter is rapidly operated. The tank 3 is fed by the siphon pipe 4 whereby the levels in the two tanks are kept equal and the momentum in pipe 4 is taken up by tank 3. The surging of the liquid due to the momentum in pipe 4 takes place in the tank 3 so that the accuracy of the pump is not affected thereby. After the tanks 1 and 3 are drained, the tank 1 is replenished through the fill pipe 2, and the preferable operation is to fill until the liquid stands at a level in the fill pipe 2 which is above the level of pipe 4, whereby the siphon to the tank 3 is automatically reëstablished. It will thus be evident that, with the arrangement shown, all the advantages of a supply closely adjacent the pump are obtained without having the supply so located. If, however, the siphon between the tanks does not start automatically for any reason, such as insufficient filling of pipe 2, for example, the siphon may be positively reëstablished by the pump A. The tank 3, as has been described, is air tight and therefore continued pumping will start the flow in the pipe 4.

Thus, an improved supply apparatus has been provided for use with measuring pumps to eliminate surging therein and the consequent inaccuracy of measurement. It is recognized that modifications may be made in the specific structure heretofore described for illustrative purposes without departing from the scope of the invention which is defined more accurately in the appended claims than in the foregoing description.

What I claim is—

1. A pumping apparatus, comprising, in combination, a measuring pump, a main supply tank for said pump at a distance therefrom, an intermediate tank located adjacent said pump, with connections between said tanks and between said second tank and said pump, all constructed and arranged to prevent inaccurate measurement of the pump due to surging.

2. A pumping apparatus, comprising, in combination, a suitable measuring pump, a main supply tank at a distance from said pump, a relatively small tank located near the pump and arranged to directly supply the latter, connections between said small tank and the pump and connections between the two tanks arranged to feed the smaller from the larger by automatic siphon action, all constructed and arranged so that the momentum of the liquid from the main supply tank cannot act on the pump and cause the delivery of inaccurately measured quantities.

3. An anti-surge device for a measuring pump, comprising, an air tight tank adapted to be interposed between a measuring pump and its supply at a point adjacent the pump, said tank having an inlet provided for air tight connection with the supply, and an outlet provided for air tight connection with a measuring pump, said tank adapted to be automatically filled from the supply by siphon action and arranged to permit automatic reëstablishment of siphon action by pumping, all constructed and arranged so that the momentum of the liquid flowing from the supply is prevented from acting on the measuring pump to cause the delivery of inaccurately measured quantities therefrom.

4. The combination with a measuring pump, of a supply tank adapted to be placed at a distance therefrom and an auxiliary tank of relatively small capacity arranged to directly feed the pump through a short distance, and a siphon between the supply and auxiliary tanks arranged to feed the latter through a relatively long distance and adapted to be automatically reëstablished by filling of the supply tank, all constructed and arranged so that the momentum of the liquid flowing through the relatively long distance is dissipated in the auxiliary tank and is prevented from acting on the pump to cause the delivery of inaccurately measured quantities therefrom.

5. A pumping apparatus, comprising, in combination, a measuring pump, a supply tank therefor at a distance from the pump, an air tight tank adjacent the pump, a connection between the latter and the second tank and a siphon connection between the two tanks, all constructed and arranged to prevent surging of the liquid through the pump and to permit the automatic reëstablishment of the siphon between said tanks by filling of the latter or by pumping.

GEORGE C. ROBERTS.